United States Patent [19]

Brimmer

[11] Patent Number: 5,316,055
[45] Date of Patent: May 31, 1994

[54] BICYCLE TIRE RECHARGE APPARATUS

[76] Inventor: John A. Brimmer, 1911 W. Freeway #2, Grand Prairie, Tex. 75051

[21] Appl. No.: 48,313

[22] Filed: Apr. 19, 1993

[51] Int. Cl.$^5$ .................. B63C 9/24; B60C 29/06
[52] U.S. Cl. .................. 141/38; 141/17; 141/83; 141/329; 222/5; 224/39; 224/42
[58] Field of Search .................. 141/38, 17, 19, 83, 141/329, 330; 224/39, 30 R, 42; 222/5

[56] References Cited

U.S. PATENT DOCUMENTS

| | | | |
|---|---|---|---|
| 2,747,770 | 5/1956 | Pereira | 141/17 X |
| 4,260,075 | 4/1981 | Mackal | 222/5 |
| 4,489,855 | 12/1984 | Boetger | 222/5 |
| 4,500,014 | 2/1985 | Zimmerly | 222/5 |
| 4,773,454 | 9/1988 | Kroh et al. | 141/330 |
| 4,946,067 | 8/1990 | Kelsall | 222/5 |
| 4,969,493 | 11/1990 | Lee | 141/78 |
| 5,012,954 | 5/1991 | Will | 222/5 |

FOREIGN PATENT DOCUMENTS

| | | | |
|---|---|---|---|
| 13574 | 3/1911 | France | 141/38 |
| 276209 | 6/1930 | Italy | 141/38 |
| 136718 | 11/1978 | Japan | 141/38 |

Primary Examiner—Ernest G. Cusick
Attorney, Agent, or Firm—Leon Gilden

[57] ABSTRACT

An apparatus including a first housing coaxially aligned with and separable relative to the second housing is provided, wherein the first housing includes a puncture rod arranged to address and puncture a gas charged cylinder within the second housing, whereupon the puncture rod includes pneumatic conduit structure to direct pressurized gas from the cylinder into a delivery conduit for mounting to an associated bicycle tire.

4 Claims, 4 Drawing Sheets

BICYCLE TIRE RECHARGE APPARATUS

BACKGROUND OF THE INVENTION

1. Field of the Invention

The field of invention relates to tire inflation apparatus, and more particularly pertains to a new and improved bicycle tire recharge apparatus wherein the same is directed to the recharging of bicycle tires.

2. Description of the Prior Art

Bicycle tire recharge structure typified as manual pump structure is indicated in the U.S. Pat. Nos. 4,712,592; 4,569,275; and 4,842,290.

The advent of racing style tires having pressures to one hundred to one hundred twenty pounds per square inch requires great effort frequently exceeding the sealing capacity of conventional bicycle pumps to deliver such pressures. The instant invention attempts to overcome deficiencies of the prior art by eliminating manual pneumatic pump structure and in lieu thereof employing a pressurized gas canister structure arranged for selective inflation of a pneumatic tire and in this respect, the present invention substantially fulfills this need.

SUMMARY OF THE INVENTION

In view of the foregoing disadvantages inherent in the known types of bicycle tire pump structure now present in the prior art, the present invention provides a bicycle tire recharge apparatus wherein the same is arranged to direct pressurized air from a canister into a bicycle tire. As such, the general purpose of the present invention, which will be described subsequently in greater detail, is to provide a new and improved bicycle tire recharge apparatus which has all the advantages of the prior art bicycle tire pump structure and none of the disadvantages.

To attain this, the present invention provides an apparatus including a first housing coaxially aligned with and separable relative to the second housing, wherein the first housing includes a puncture rod arranged to address and puncture a gas charged cylinder within the second housing, whereupon the puncture rod includes pneumatic conduit structure to direct pressurized gas from the cylinder into a delivery conduit for mounting to an associated bicycle tire.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved bicycle tire recharge apparatus which has all the advantages of the prior art bicycle tire pump structure and none of the disadvantages.

It is another object of the present invention to provide a new and improved bicycle tire recharge apparatus which may be easily and efficiently manufactured and marketed.

It is a further object of the present invention to provide a new and improved bicycle tire recharge apparatus which is of a durable and reliable construction.

An even further object of the present invention is to provide a new and improved bicycle tire recharge apparatus which is susceptible of a low cost of manufacture with regard to both materials and labor, and which accordingly is then susceptible of low prices of sale to the consuming public, thereby making such bicycle tire recharge apparatus economically available to the buying public.

Still yet another object of the present invention is to provide a new and improved bicycle tire recharge apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
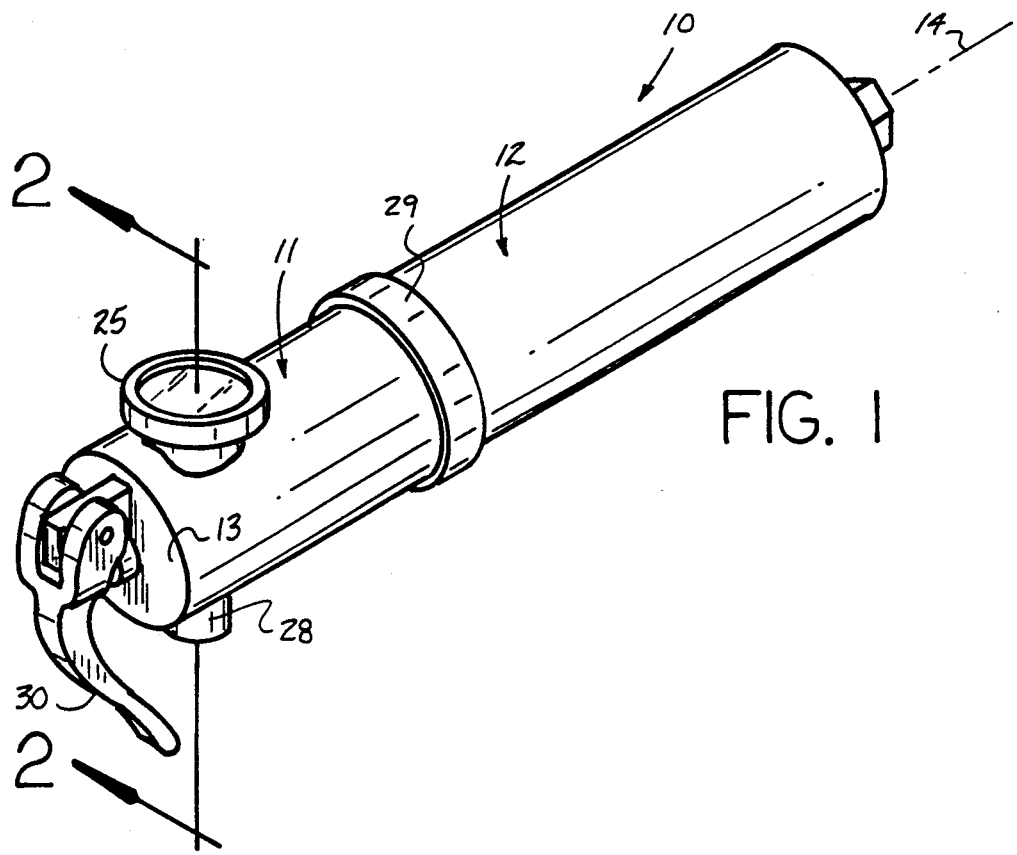
FIG. 1 is an isometric illustration of the invention.
Figure 2:
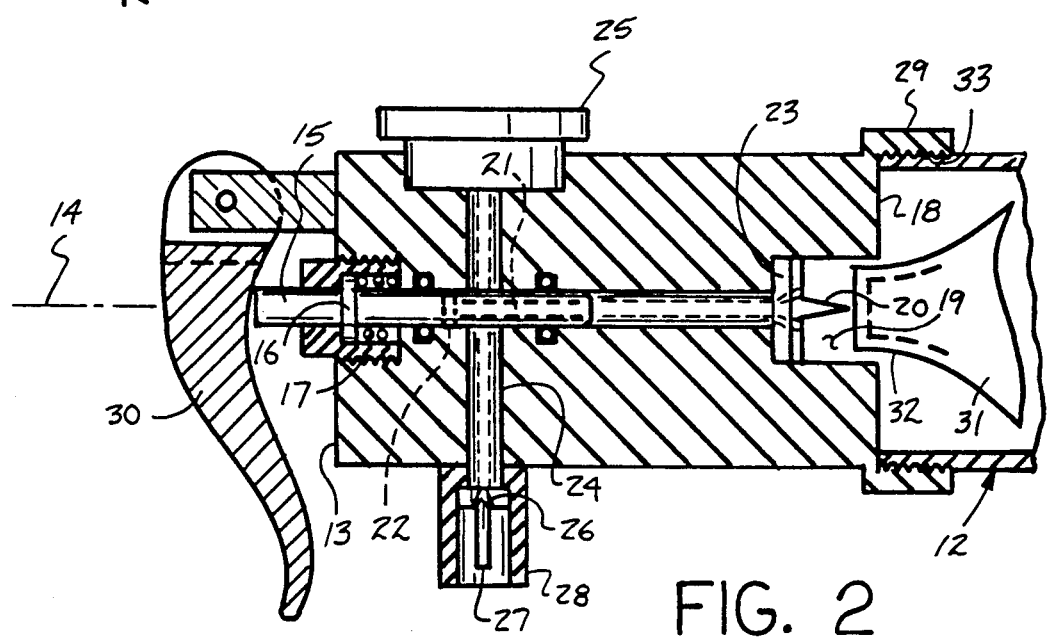
FIG. 2 is an orthographic view, taken along the lines 2—2 of FIG. 1 in the direction indicated by the arrows.
Figure 3:
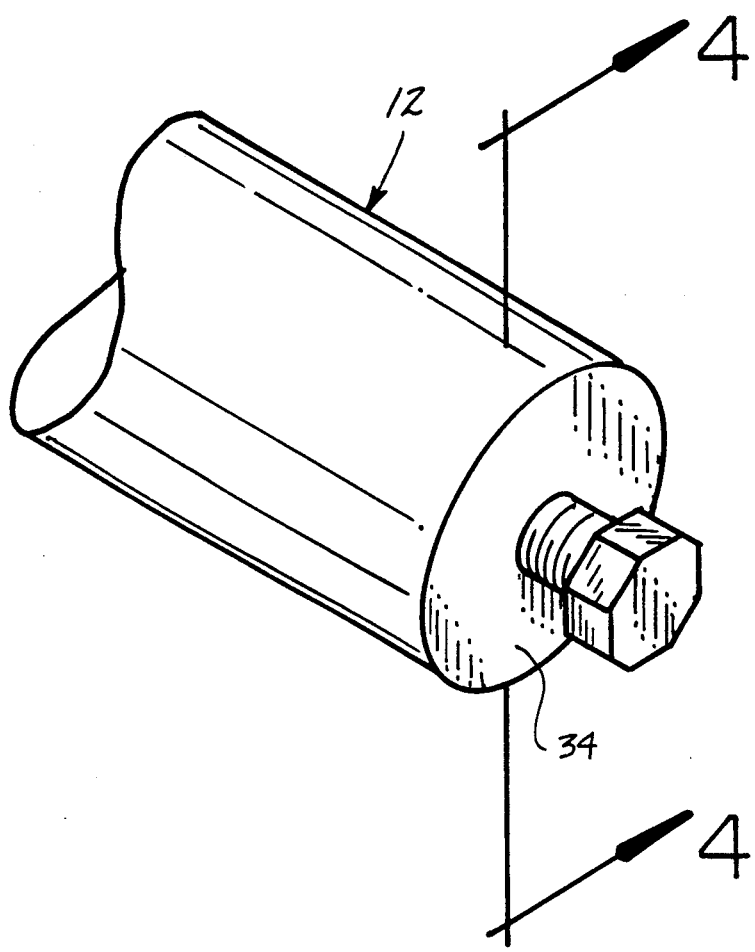
FIG. 3 is an isometric partial view of the second housing structure.

With reference now to the drawings, and in particular to FIGS. 1 to 8 thereof, a new and improved bicycle tire recharge apparatus embodying the principles and concepts of the present invention and generally designated by the reference numerals 10 and 10a will be described.

More specifically, the bicycle tire recharge apparatus 10 of the instant invention essentially comprises a first housing 11 arranged for separable mounting relative to a second housing 12 in a coaxially aligned relationship along a central axis 14. The first housing 11 includes a first housing first end wall 13 having a plunger 15 reciprocatably mounted therethrough along the axis 14, with the plunger 15 having an abutment disc 16 positioned within a plunger cavity permitting reciprocation of the plunger, wherein a spring member 17 is mounted intermediate the abutment disc 16 and the first housing 11 to bias the plunger 15 exteriorly of the first housing first end wall 13 for engagement of the pivotally mounted lever actuator 30. The first housing 11 having a first housing second end wall 18 includes a second end wall socket cavity 19 coaxially aligned along the axis 14, with a puncture projection 20 mounted to the plunger 15 within the socket cavity 19. The plunger 15 includes a plunger first conduit 21 directed along the plunger projecting through the plunger end wall piston 23 reciprocatably mounted within the socket cavity 19, with the first conduit 21 intersecting and in pneumatic communication with a second conduit 22 that is in selective pneumatic communication with the delivery conduit 24. The delivery conduit 24 has a delivery conduit first end in pneumatic communication with a pressure gauge 25, with a delivery conduit second end extending exteriorly of the first housing 11 within a delivery conduit socket 28, having a needle valve lug 27 therewithin for effecting depressing of a conventional valve of a bicycle tire (not shown). Upon deflection of the plunger 15 from the first position with the second conduit 22 displaced from the delivery conduit 24 to a second position, where the second conduit 22 is in pneumatic communication with the delivery conduit, the puncture projection 20 is arranged to be directed through and puncture the pressure cylinder 31 through the cylinder neck 32 directing pressurized air along the first conduits 21 and 22 into the delivery conduit 24. The first housing 11 includes a first housing second end wall internally threaded annular flange 29 coaxially aligned relative to the axis 14 for mounting the second housing externally threaded first end side wall 33 permitting removal of the second housing 12 for replenishment of the pressure cylinder 31. The housing second end wall 34 includes an end wall cradle 35 mounted to an externally threaded cradle boss 36 threadedly directed through the second end wall 34.

Figure 4:
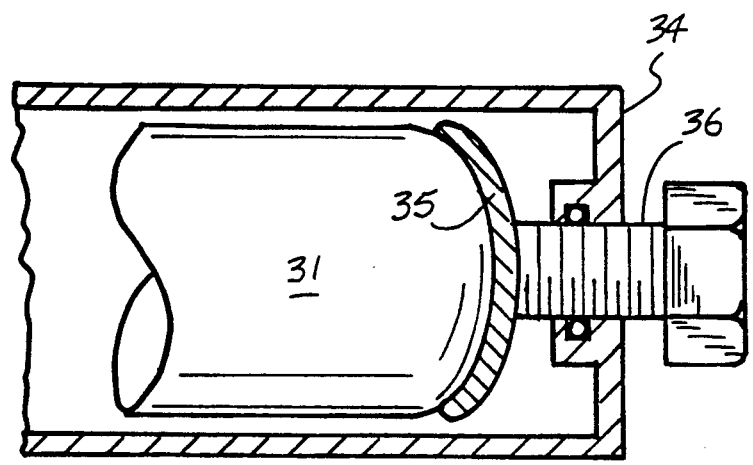
FIG. 4 is an orthographic view, taken along the lines 4—4 of FIG. 3 in the direction indicated by the arrows.
Figure 5:
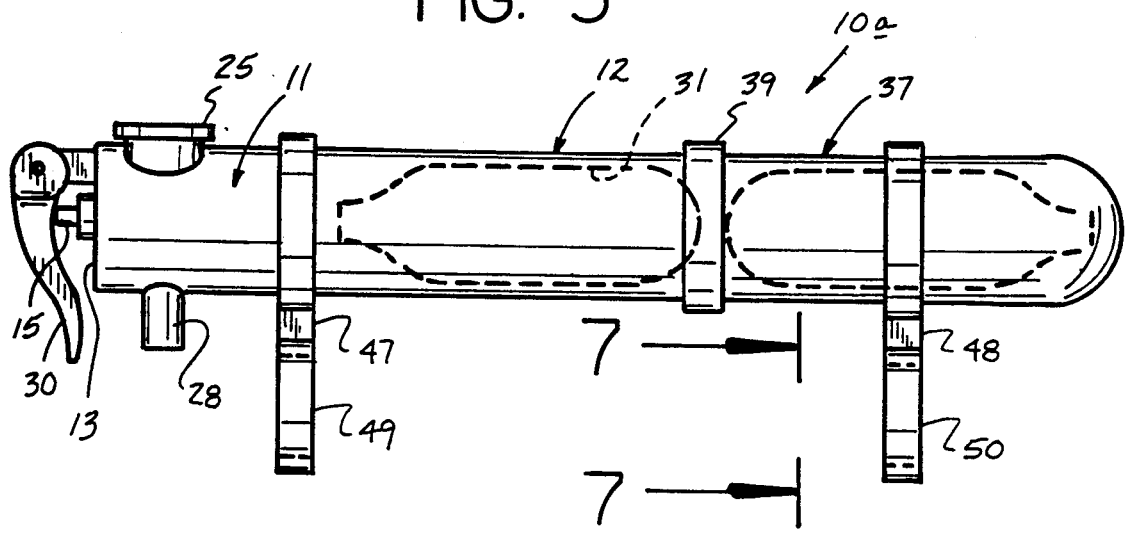
FIG. 5 is an orthographic side view of a modified structure employed by the invention.
Figure 6:
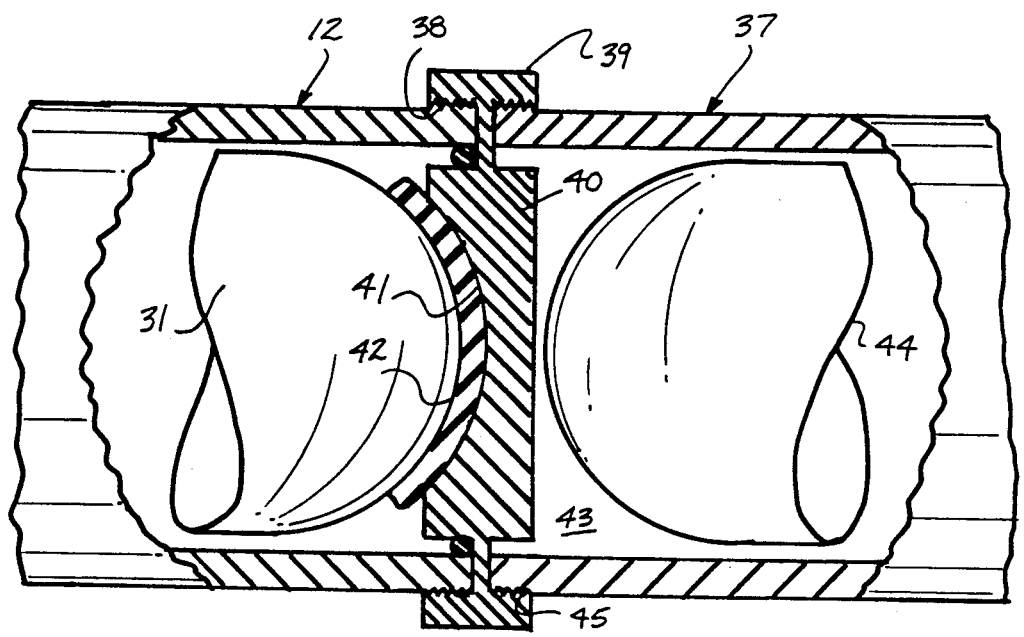
FIG. 6 is an orthographic view of the structural association of the second housing relative to the third housing of the apparatus as indicated in FIG. 5.

The FIGS. 5-8 indicates the apparatus 10a further including a third housing 37 coaxially aligned along the axis 14 with the first and second housings 11 and 12 respectively. The third housing includes a coupling sleeve 39 arranged for threadedly receiving a modified second housing externally threaded end wall 38 in a forward end of the coupling sleeve 39, with a rearward end of the coupling sleeve 39 threadedly receiving the third housing externally threaded first end 45, that includes a third housing storage cavity 43 to secure a further gas cylinder 44 therewithin. The coupling sleeve 39 includes a coupling sleeve wall 40 orthogonally oriented relative to the axis 14 intermediate the first and second housings interface such that a cushion pad 42 mounted upon the concave recess 41 positions a rearward end of the pressure cylinder 31, as indicated in FIG. 6. Rotation of the coupling sleeve 39 onto the second housing externally threaded end 38 directs the pressure cylinder 31 into operative communication with the puncture projection 20 in lieu of the externally threaded cradle boss 36 and cradle 35, as indicated in FIG. 4, relative to the apparatus 10.

Figure 7:
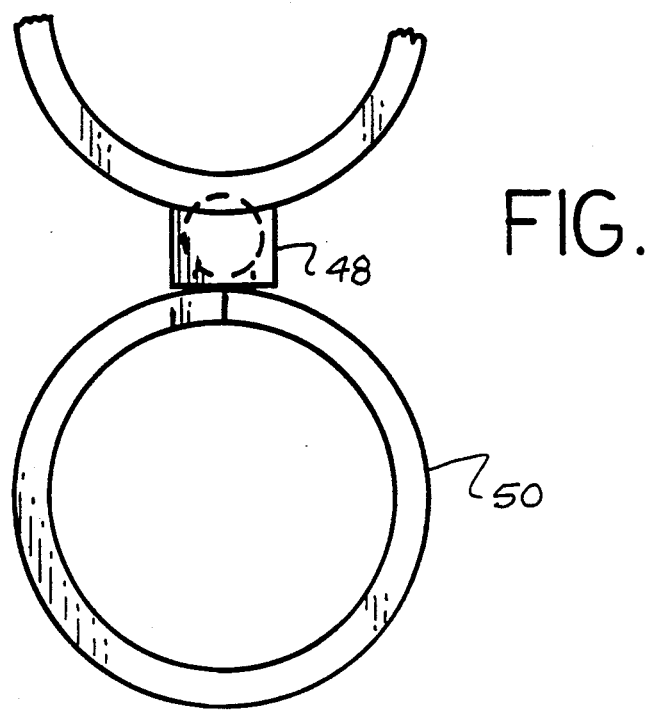
FIG. 7 is an orthographic view, taken along the lines 7—7 of FIG. 5 in the direction indicated by the arrows.
Figure 8:
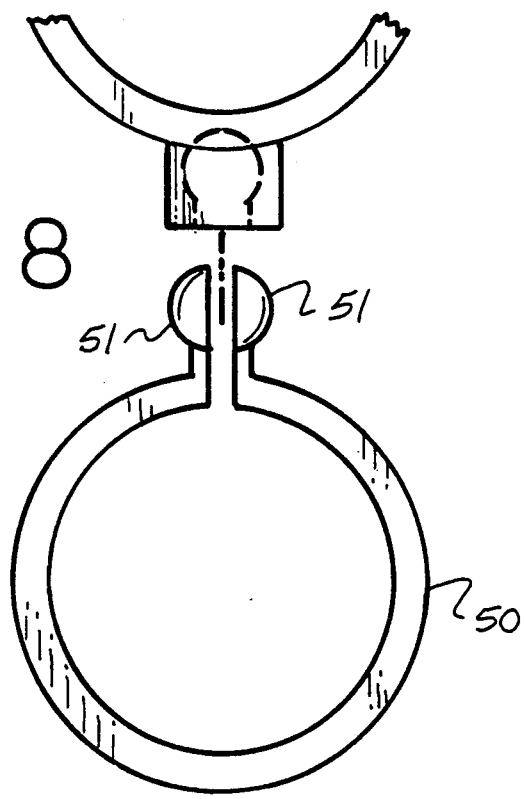
FIG. 8 is an orthographic view indicating the use of a mounting split ring in a separated orientation relative to its associated socket.

Reference to FIG. 5 indicates the use of respective first and second sockets 47 and 48 mounted to the first and third housings mounting respective first and second split rings 49 and 50 within the first and second respective sockets. The first and second split rings 49 and 50, as indicated in FIG. 8, include split facing semi-spherical head portions 51 arranged for reception within an associated socket, whereupon the split rings are initially positioned about a bicycle tube structure (not shown) and then secured to the respective socket structure, as indicated in FIG. 7, to thereby secure the pump structure relative to an associated bicycle framework.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A bicycle tire recharge apparatus including a first housing and a second housing, with the first housing and second housings coaxially aligned along a predetermined axis, with the first housing having a first housing first end wall spaced from a first housing second end wall, the first housing first end wall including a plunger coaxially aligned along the axis reciprocatably directed into the first housing, with the plunger including an abutment disc mounted within the first housing having a spring captured between the abutment disc and the first housing to bias the plunger exteriorly of the first housing first end wall, and an actuator lever pivotally mounted to the first housing in engagement with the plunger, the first housing second end wall having a socket cavity, with the socket cavity including the plunger directed therethrough terminating in a puncture projection coaxially aligned along the axis, with the puncture projection mounted to a plunger piston within the socket cavity, and the plunger including a first conduit extending from the plunger piston through the plunger in communication with a second conduit orthogonally intersecting the first conduit, and a delivery conduit directed orthogonally relative to the axis, with the delivery conduit having a delivery conduit first end terminating in a pressure gauge, and the delivery conduit second end directed from the first housing, with a conduit socket receiving the delivery conduit second end, and the delivery conduit socket including a needle valve lug mounted fixedly coaxially aligned along with the socket, with the delivery conduit in pneumatic communication through the delivery conduit socket, and the second conduit arranged in a first position displaced relative to the delivery conduit, and the second conduit in pneumatic communication with the delivery conduit when the actuator lever effects deflection of the plunger to a second position to simultaneously project the puncture projection coaxially aligned along the axis, with the second housing having a second housing cavity, the second housing cavity including a pressure cylinder, and the pressure cylinder including a neck coaxially aligned along the axis in facing relationship relative to the puncture projection to effect puncturing of the pressure cylinder upon displacement of the plunger to the second position directing pressurized gas from the pressure cylinder along the first conduit, the second conduit, and the delivery conduit.

2. An apparatus as set forth in claim 1 wherein the second housing includes a second housing first end arranged for selective engagement with a first housing second end, and a third housing, and a coupling sleeve, the second housing including a second housing second end arranged for engagement with the coupling sleeve, and the third housing including a third housing first end arranged for securement to the coupling sleeve, with the second housing and the third housing arranged in coaxially aligned relationship, and the coupling sleeve including a coupling sleeve wall oriented orthogonally relative to the axis at an interface between the second housing and the third housing, and the coupling sleeve wall having a concave recess including a cushion pad for receiving the pressure cylinder thereon.

3. An apparatus as set forth in claim 2 including a first socket mounted to the first housing, and a second socket mounted to the third housing, with the first socket having a first split ring selectively securable to the first socket, and the second side having a second split ring selectively securable to the second socket, wherein the first split ring and the second split ring are arranged for securement about a bicycle tube framework.

4. An apparatus as set forth in claim 3 wherein the first split ring and the second split ring each include facing semi-spherical head portions arranged for abutment relative to one another for reception within one of said first socket and said second socket.

* * * * *